United States Patent [19]
Harwood

[11] 3,712,481
[45] Jan. 23, 1973

[54] ACTUATOR

[75] Inventor: Oliver P. Harwood, Huntington Beach, Calif.

[73] Assignee: McDonnell Douglas Corporation

[22] Filed: Dec. 23, 1971

[21] Appl. No.: 211,367

[52] U.S. Cl..................................214/1 CM, 74/469
[51] Int. Cl. .................................................B25j 1/02
[58] Field of Search..214/1 C M; 74/469, 470, 501 R

[56] References Cited

UNITED STATES PATENTS

| 3,284,964 | 11/1965 | Saito | 214/1 C M |
| 3,631,737 | 1/1972 | Wells | 214/1 C M |

Primary Examiner—Gerald M. Forlenza
Assistant Examiner—George F. Abraham
Attorney—Walter J. Jason et al.

[57] ABSTRACT

A remotely controllable actuator system comprised of one or more modules having a first plurality of wedge links connected together by torque transmission means, a second plurality of wedge links which are connected together by torque transmission means positioned between the links of the first plurality of wedge links and in sliding contact therewith and third torque transmitting means extending from one end of the module to the other. The module also may include controllable drive means for rotating the first plurality of wedge links with respect to the second plurality of wedge links to cause bending of the module in a predetermined plane and second drive means for driving said first and second pluralities of wedge links with respect to the third torque transmitting means to change the predetermined plane of curvature in which the module can bend.

13 Claims, 15 Drawing Figures

PATENTED JAN 23 1973

INVENTOR.
OLIVER P. HARWOOD
BY
*[signature]*
ATTORNEY

INVENTOR.
OLIVER P. HARWOOD

ACTUATOR

BACKGROUND OF THE INVENTION

There is a need for a remote manipulating system for use in hostile environments where human activity is difficult or impossible. Typically, a remote control manipulating system should be a mere extension of the operator's hands so that as activities are performed within a favorable environment and closed at hand, the manipulating system repeats and performs the same activities in the unfavorable environment. Such systems are often used in metal furnaces and foundaries, in research with radioactive material, under water, in space and in many other areas. In such places a conventional hinged arm is often used. However, the conventional hinged arm type manipulating systems have various disadvantages such as not having a protected central core through which control wire, fluid conduits or other similar vulnerable equipment may be confined. They also must be designed for a specific purpose and therefore, they cannot be standardized nor are they particularly desirable when various missions must be performed which require various lengths and movement capabilities in a single manipulator systems. Also, the prior known manipulative systems in many instances are difficult to store, are incapable of complex movement and must have exposed dynamic seals which are very susceptible to failure.

SUMMARY OF THE INVENTION

The present actuator systems, which are especially useful as remotely controllable manipulator systems, can be constructed in modular form including extension modules and actuator modules. The modules are designed so that a predetermined maximum number of actuator modules with any number of extension modules can be combined into the actuator system with the extender modules merely serving as means for transmitting signals to the actuator modules or for forming extended connections therebetween. A longitudinal tunnel is provided through the center of each module for electric wires and/or flexible tubing which can be used to transmit fluids, gases, or other mediums.

The actuator modules are constructed from a plurality of wedge shaped hollow circular links slidably connected together with alternate links being connected together for rotation by means such as two flexible bellows. Usually, an outer bellows is also provided, and control means such as two sets of electric motors are positioned in each of the actuator modules. One set of motors is used to control the relative rotation between the alternate wedge links so that bending motion in a predetermined plane is produced while the other set of motors is connected between the outer bellows and both sets of wedge links to rotate the predetermined plane in which the module bends. The rotation produced is usually in excess of plus or minus 90° while the bending produced from straight is usually plus or minus 120° included angle in the plane of curvature. The bending may be greater or less than specified depending on the number of links in the module and the angle of the end surfaces thereof. The outer bellows along with sealing connections at the opposite ends of the modules can hermetically seal the system so that lubrication and corrosion problems are avoided by isolating the movement mechanism therein from hostile environments. It should be noted that the use of troublesome external dynamic seals is avoided.

Each actuator module of the system usually has four controls; a forward and a reverse for both the rotation and bending drive motion mechanisms. The control center for the actuator system is, of course, provided at the location from which the system is to be controlled. If one or more modules should become inactivated, control can be maintained with a reduction in flexibility through the use of other modules and at a more convenient time, any module can be removed and replaced by an identical unit without any rewiring or changing of the control system.

When the system is a manipulator system, a miniature manipulator duplicating the motions of the full size manipulator can be incorporated as the control mechanism of the system. This combined with a replica of surrounding shapes to the same scale can provide instinctive feel to the operator as well as protection of the system from collision with adjacent hardware. The replica type protection from collision is a highly desirable feature of the present system because the system's inherent increase in flexibility and motion over other manipulator systems makes inadvertant collision more likely.

The system has many uses such as in underwater applications to aid scientific explorations, salvage and exploitation of the ocean bottom resources. When used under water, the internal volume of the manipulator modules can be filled with a suitable incompressible fluid such as silicone oil to enable the modules to balance pressure at any depth. Some limited buoyancy may also be provided. Some of the proposed specific uses for such underwater manipulators are the deployment of light sensors and cameras into otherwise inaccessible places such as the interior of sunken wrecks, and the positioning of remotely manipulated tools such as oil well drilling equipment, salvage hoists and tools for geological and/or oceanographic sampling. Since the interior of the unit can be used as a positionable pipeline, the present system also can be used for pumping or conveying gases to supply an atmosphere to underwater dwelling units and for flotation of hollow objects to aid in lifting them to the water's surface.

The present system can also be used in space more efficiently than the presently known or proposed manipulator systems. For example, the present system can be built to position an astronaut safely during extra vehicular activity. The system can be preprogrammed to change films in remote optical experiments, make a soft docking connection between spacecraft, provide for transfer of material, winch spacecraft together before making a hard connection, or to transfer fluids between spacecraft. The system can also make external inspections and repairs in space through a remotely controlled integral viewing eye such as a TV camera and appropriate tools. These latter applications can be performed so efficiently that the extra vehicular activity now required or anticipated is eliminated thereby eliminating considerable risk from the duties of an astronaut.

Of course it should also be mentioned that the present system is adaptable for use anywhere prior art manipulators are being used and due to its simple construction, it is reliable and versatile so that it presents many advantages over the conventional systems. For example, the manipulator portion of the system can be coiled up like a snake and stowed in a relatively small space. It can be constructed with structural rigidity at a light weight due to its hollow construction and yet a high mechanical advantage can be incorporated therein. The system is adaptable to man uses and applications due to its standardize module construction which allows many variations both in length and flexibility. The system can provide manipulator arm shapes formed of tangent arcs and straight line or sinuous curves to minimize hang-up and entanglement on obstructions and also, especially for underwater use, it needs no open connection so that its control functions are easily fed through the pressure resisting envelope of a submarine. At the same time, the manipulator system is protected in a hostile environment by its outer flexible bellows and the likelihood of internal damage thereto by the hostile environment is therefore extremely small.

It is therefore an object of the present invention to provide a versatile, trouble-free manipulator system.

Another object of the present invention is to provide an actuator system comprised of modular units which can be standardized for quick and easy replacement and/or repair.

Another object is to provide a manipulator system which can be easily modified by adding or removing modules.

Another object is to provide a manipulator through which liquids, gases or other fluids can be conducted.

Another object is to provide a manipulator assembly which can be hermetically sealed along the length thereof.

Another object is to provide a manipulator system which can be used even though one or more portions thereof become inoperative.

Another object is to provide an actuator system which can be controlled from a pressurized vehicle without the need for an opening in the pressure envelope thereof.

Another object is to provide a manipulator which can be provided with a variable density so that it can be used at neutral buoyancy in many types of fluids.

Another object is to provide a manipulator system which can be used in the harsh environment of deep space yet which is easily stowable and/or disconnectable.

These and other objects and advantages of the present invention will become apparent after considering the following detailed specification which covers particular embodiments thereof in conjunction with the accompanying drawings wherein:

DESCRIPTION OF THE PRESENT EMBODIMENTS

Figure 1:
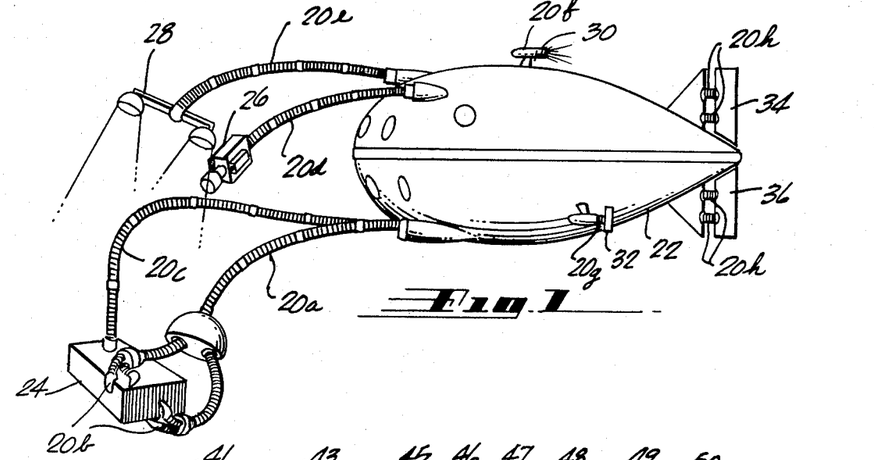
FIG. 1 shows an underwater vehicle having manipulator system constructed according to the present invention for use in various applications.

Referring to the drawings more particularly by reference numbers, number 20 in FIG. 1 refers to manipulator systems constructed according to the present invention in use on an underwater vehicle 22. System 20a is a grappler manipulator system employing a grappler finger manipulator system 20b to engage cargo 24. A conduct manipulator system 20c is also shown in contact with the cargo 24. Such conduit systems 20c can be used either to conduct gas into the cargo 24 to increase its buoyancy or to remove or add fluids thereto for storage or removal. The system 20d is for maneuvering and positioning a camera 26 while system 20e is shown positioning lights 28 for the camera 26. The vehicle 22 also uses manipulator system 20 for directional control and movement. For example, system 20f positions a directable fluid propulsion conduit 30 while system 20g forms the pointing means of an electrically powered thruster 32. Systems 20h, on the other hand, are used to control the movement of the rudder members 34 and 36 of the vehicle 22. It should be obvious that the systems 20h need only produce bending movement in a single horizontal plane and therefore, no means are required in such systems 20h to rotate the bending plane.

Figure 2:
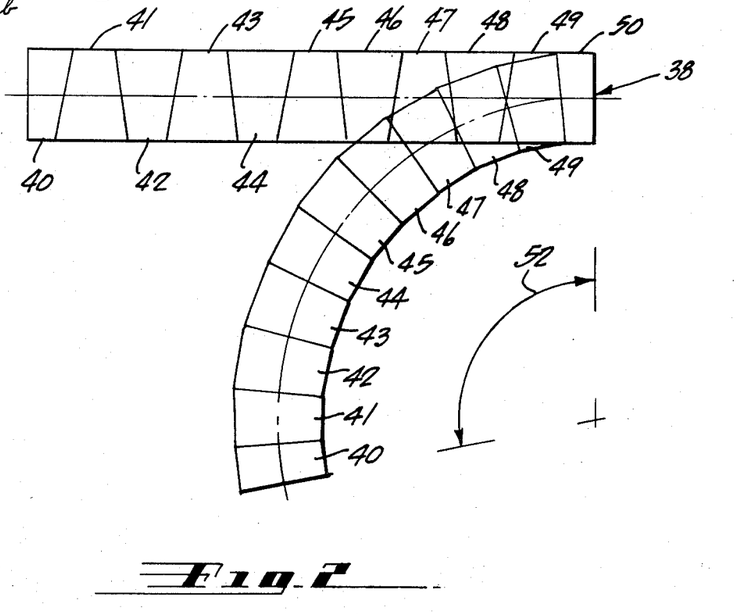
FIG. 2 is a simplified drawing of a portion of the present system extender generable by the rotary wedge elements thereof.

The principle behind the bending employed in a manipulator module 38 is similar to that employed on adjustable vent lines commonly seen above gas water heaters. As can be seen in FIG. 2, the module 38 includes a plurality of rotary wedges 40 through 50. The wedges 40 and 50 are shown as half wedges with wedges 41 through 49 being identical whole wedges. When the narrow portions of the even numbered wedges are in alignment with the wide portions of the odd numbered wedges, the module 38 is in its straight condition. As the odd numbered wedges are rotated in one direction and the even numbered wedges are rotated an equal amount in the opposite direction, the module 38 assumes a bent condition. In FIG. 2 the module 38 in its bent condition has been rotated 90° for clarity since equal and opposite rotation of the wedges 40 through 50 positioned as shown would cause the module 38 to bend horizontally either into or out of the paper. As should be obvious, the maximum obtainable angle of curvature 52 that the module 38 can attain is dependent upon the number and geometry of the wedges 40 through 50. The maximum curvature of the module 38 can be tightened by increasing the angle of the wedges and/or narrowing the narrow portions of the wedges. The above modifications plus the adding of additional wedges can be used to provide a module 38 with a greater angular deflection. It should also be noted that modules 38 can be constructed with wedges of differing angles connected for rotation in different ways so that the modules 38 can bend in other shapes than the shapes shown.

Figure 3:
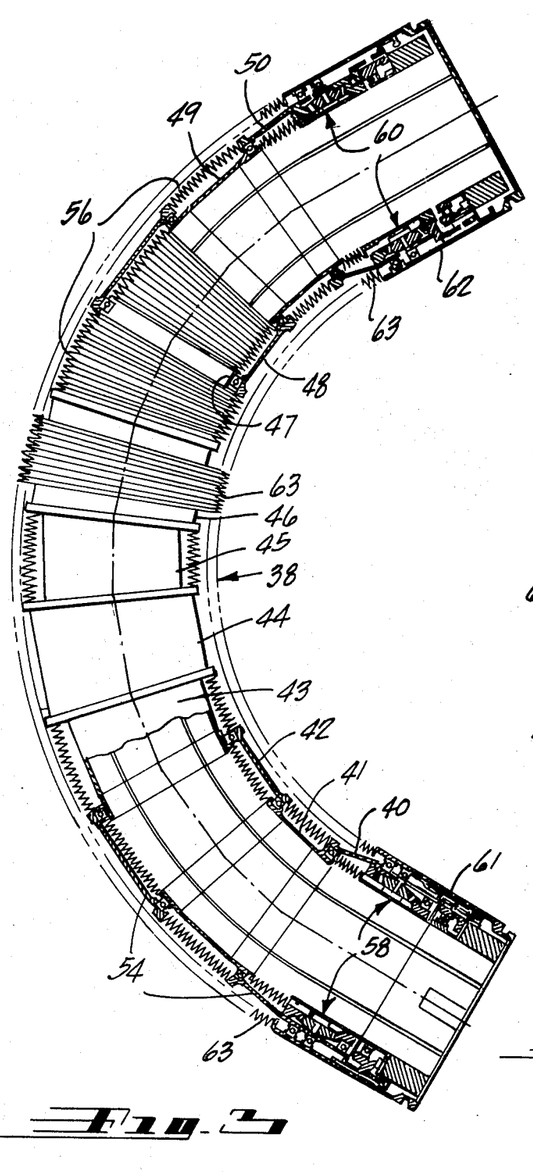
FIG. 3 is a partially cutaway side view of a manipulator module constructed according to the present invention.

As shown in FIG. 3, it is preferred to connect the wedges 40 through 50 with flexible torque transmitting means such as the bellows means 54 connecting the odd numbered wedges and the other bellows means 56 connecting the even numbered wedges to form the two basic bending elements of a manipulator module 38. The bellows means 54 and 56 are interconnected by suitable bending means 58 and rotation means 60 at the module ends 61 and 62 respectively. The bending means 58 enable the odd and even numbered wedges 40 through 50 to be driven an equal but opposite amount for bending. The rotation means 60 enable all the wedges 40 through 50 to be driven in the same direction relative to the ends 61 and 62 and outer flexible torque transmitting means such as third bellows means 63 to change the plane of bending. The bellows means 63 in combination with the ends 61 and 62 preferably hermetically seal each module 38.

Figure 4:
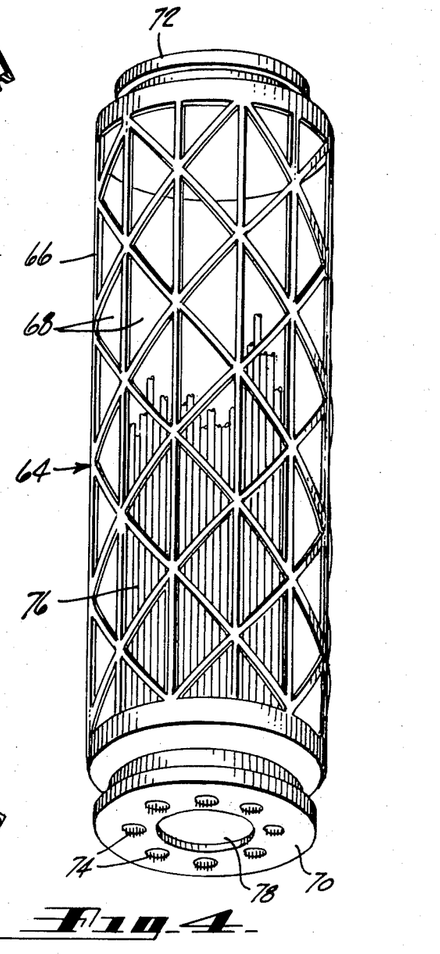
FIG. 4 is a side view of an extender module for the present manipulator system.

FIG. 4 shows an extender module 64 which is used when an increase in length without an increase in flexibility is required in the present system 20. The extender module 64 includes a substantially rigid, outer cylindrical case 66 which is shown having optional openings 68 therethrough. The openings 68 reduce the mass of the module 64 but they are only suitable when it is not necessary to shield the interior of the module 64 from contaminants or to retain a neutral buoyancy capacity. The ends 70 and 72 of the module 64 are adapted to engage the ends of other extender modules 64 or the ends 62 and 63 of manipulator modules 38. The extender module 64 includes suitable electrical connectors 74 at the ends 70 and 72 thereof. These connectors 74 are connected by conductors 76, partially shown, to enable manipulator module control commands to be fed through the modules 64. The conductors 76 appear at ends 70 and 72 with identical orientation. The module 64 also includes a central opening 78 which can be used as a conduit for flow lines, electrical cables or any other means which need be extended therethrough.

Figure 5:
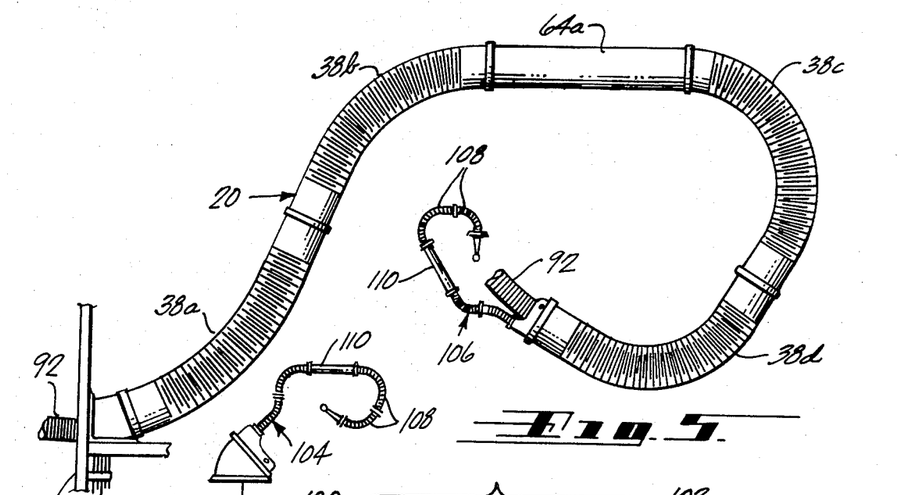
FIG. 5 is a simplified overall view of a manipulator system including alternately located replica control means therefor.
Figure 6:
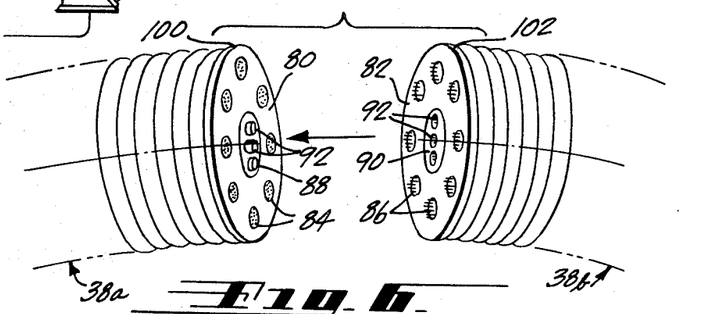
FIG. 6 is a detail view showing how modules of the present system mate with each other.
Figure 7:
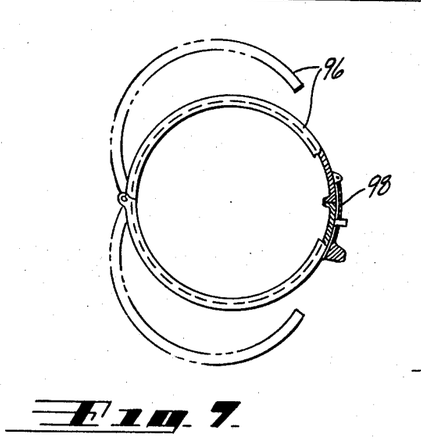
FIG. 7 is an elevational view of a clamp which can be used to hold modules together.
Figure 8:
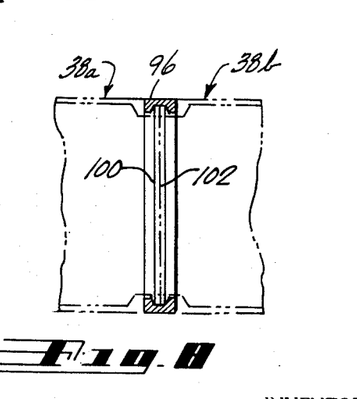
FIG. 8 is a detail view showing the clamp of FIG. 7 holding two modules together.

FIG. 5 shows a manipulator system 20 including manipulator modules 38a, 38b, 38c, and 38d with an extender module 64a positioned between modules 38b and 38c. Typical connection means for the modules are shown in FIGS. 6, 7 and 8. As can be seen, the modules 38, like modules 64, have end surfaces 80 and 82 which are adapted to engage ends of adjacent modules or attachments. Mating connectors 84 and 86 are provided in the end surfaces 80 and 82 to provide means to feed control commands through the system 20, while the center portions 88 and 90 of the modules 38a and 38b of FIG. 6 are shown having conduits 92 therethrough for transmitting gases from one end of the system 20 to the other. This is because the system 20 of FIG. 5 could be one for controlling the movement of an astronaut in extra-vehicular excursions with life support being furnished to the astronaut connected on the outer end (not shown).

It is preferably to hold the end surfaces 80 and 82 together with means which provide a hermetic seal. Such means are shown in FIGS. 7 and 8 and include a clamping ring 96 having a positive clasp 98. As shown in FIG. 8, the ring 96 has a generally U-shaped cross-section which engages outwardly extending flanges 100 and 102 on the modules to force them together and to provide the aforesaid hermetic seal. Alternate connecting means can also be employed.

The system 20 can be controlled by any suitable means including preprogramable means. In FIG. 5 replica control means 104 and 106 are shown. The replica control means 104 and 106 are constructed to be small scale replicas of the system 20 which they control. As can be seen, they include replica manipulator modules 108 and replica extender modules 110. It is preferably that such modules be connectable in a manner similar to the modules 38 and 64 of the full scale system so that any changes in the system 20 can be duplicated in the replica means 104 or 106. The replica means can be placed within the vehicle 94 for remote operation of the system 20 or at the outer end thereof to provide an astronaut connected to the conduit 92 means for controlling his own motion outside the vehicle 94.

Figure 9:
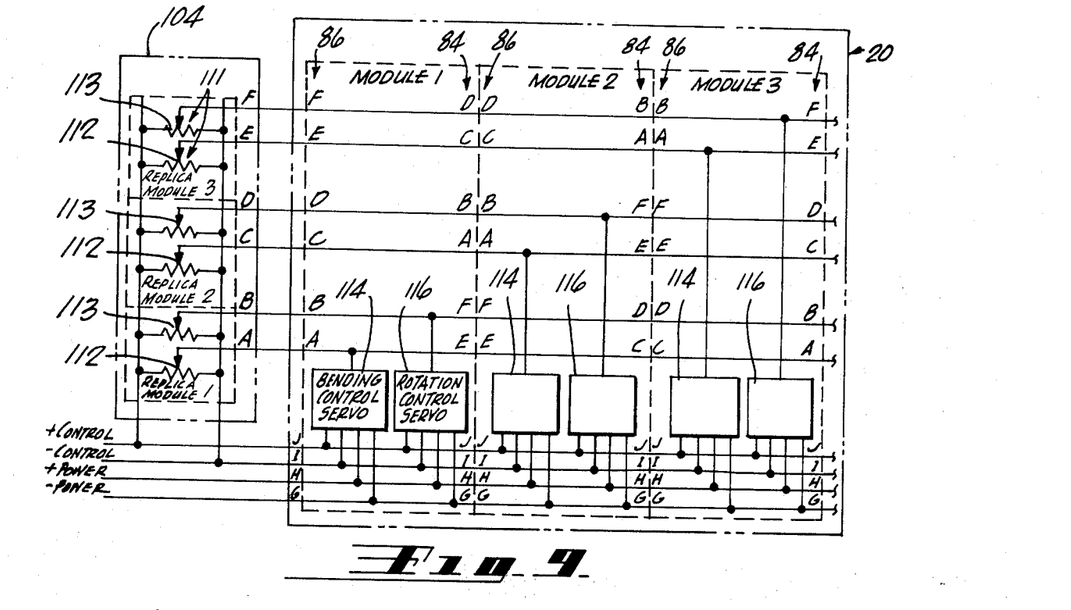
FIG. 9 is a typical wiring diagram for the present manipulator system.

FIG. 9 is a typical wiring diagram for a three module system 20. It should be noted that the pin locations of the connectors 84 and 86 of each module, as designated by letters A through J, are identical. The pins of the modules are wired so that a module 38 can be inserted anywhere in the system 20 and it will be connected to the proper control and power functions. This also enables the attachment of replica means at either end of the system 20.

The replica means 104 or 106 include position transducer means 111 in each replica manipulator module which are shown as potentiometers 112 and 113. The potentiometers are used to control the bending control servo 114 and the rotation control servo 116 respectively, by providing an electrical signal which varies with the position thereof.

Figure 10:
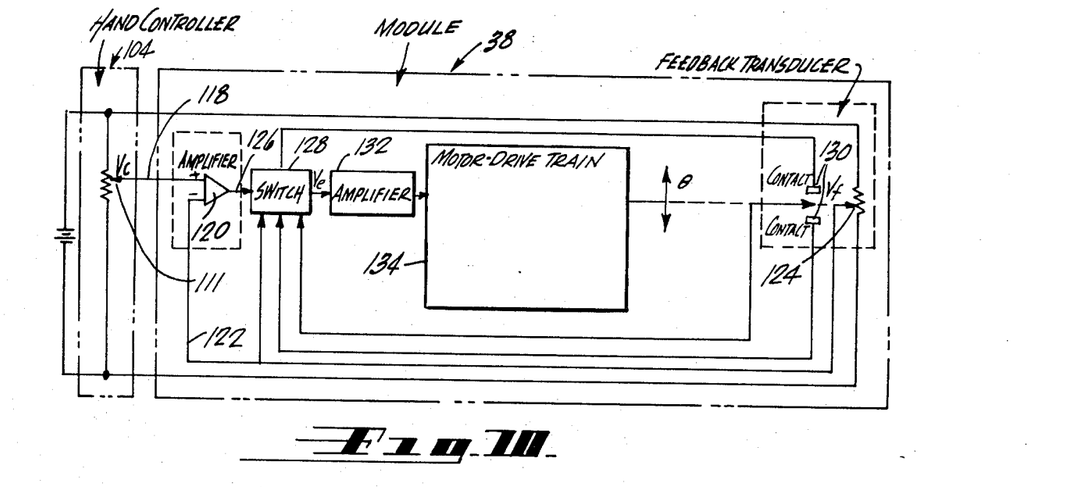
FIG. 10 is a signal diagram of a typical control circuit for one function of a system module.

A typical circuit for either the bending or the rotation control servos 114 and 116 is shown in FIG. 10. In the control circuit, a voltage signal $V_c$ dependent upon the position of the transducer 111 in the controller means 104 is fed by means of line 118 to a voltage summing amplifier 120 where it is compared to a signal $V_f$ transmitted along line 122 from a position feedback transducer 124 in the module 38. The signal $V_f$ fed along line 122 is representative of the actual bend or rotation of the module 38 and therefore any difference between the voltage $V_c$ fed on line 118 and the line 122 is an error signal $V_e$ to be corrected. Any error signal $V_e$ is amplified and fed along line 126 to an electronic switch 128. The electronic switch 128 includes electrical inputs from the feedback transducer 124 and from electrical stops 130, mechanically connected to the feedback transducer 124. The switch 128 and stops 130 are provided to assure that the bending or rotation produced by the module 38 is never in excess of predetermined limits. As long as the module 38 is within the predetermined limits, any error signal $V_e$ from the amplifier 120 is fed to motor control means such as a variable frequency inverter/power amplifier 132 which powers a connected motor and drive train 134 in a direction to eliminate the error signal $V_e$ produced by the summing amplifier 120, the motor and drive train 134 producing a mechanical output in the form of rotation or bending and labeled $\theta$ in FIG. 10.

Figure 11:
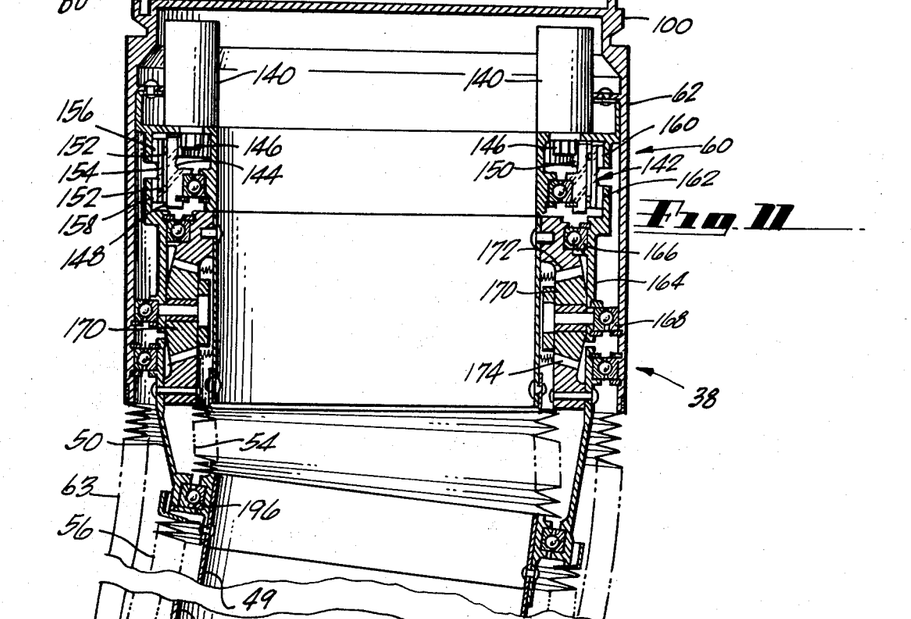
FIG. 11 is an enlarged view of an end of the module shown in FIG. 3 showing the rotator drive mechanism thereof.
Figure 12:
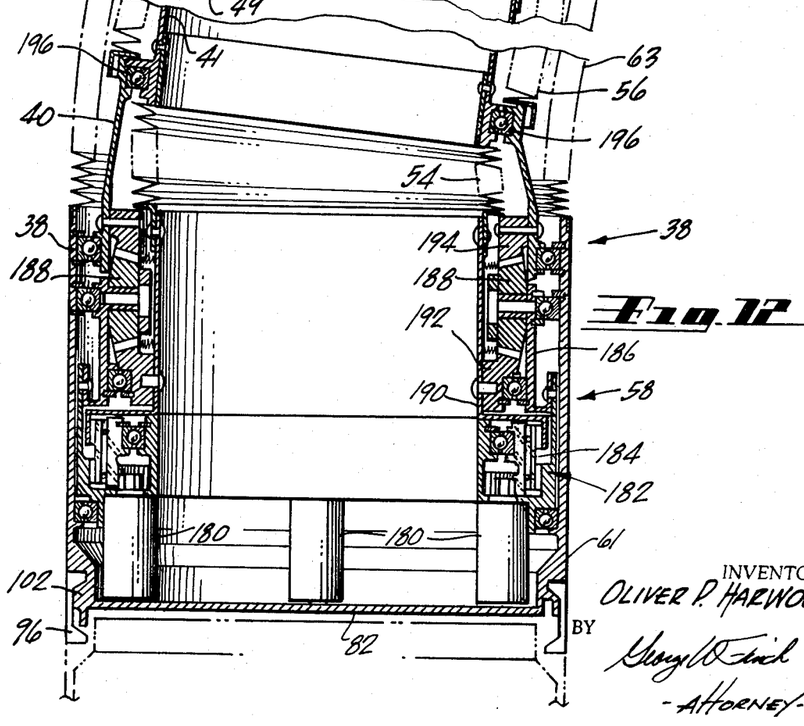
FIG. 12 is an enlarged cross-sectional view of the other end of the module shown in FIG. 3 showing the bending drive mechanism thereof.

Typical motor and drive trains 134 and their connection to a manipulator module are shown in FIGS. 11 and 12 which are enlarged, cross-sectional views of the module 38 shown in FIG. 3. FIG. 11 shows the rotation means 60 for the module while FIG. 12 shows the bending means 58.

The rotation means 60 include a plurality of motors 140 which are connected to the end 62 of the module 38. The motors 140 apply torque between the bellows means 63 and the bellows means 54 and 56 when energized by the error signal $V_e$. This is accomplished through a suitable reduction gear which is shown, for example on as a harmonic drive 142 including a wave generator 144 which is rotated by means of gears 146 connected to the motors 140. It is preferred that the reduction gear be irreversible to preclude any motion in a failed module 38. The wave generator 144 has an elliptical outer surface 148 and a circular inner surface including a ring gear 150 which is driven by the gears 146. An ellipitcal ball race 152 attaches the wave generator 144 to a flexible spline 154 which includes two outwardly facing ring gears 156 and 158. The ring gear 156 engages a rigid ring gear 160 fixedly attached elliptical the end 62 and bellows means 63 while the other ring gear 158 engages an output circular spline 162 which is part of a differential carrier 164. The differential carrier 164 is mounted by bearings 166 and 168 so that it can rotate with respect to the end 62 and bellows means 63. A plurality of idler gears 170 are connected for rotation to the differential carrier 164 and they engage facing ring gears 172 and 174 which are connected respectively to the bellows means 54 and 56. The bellows means 54 and 56 are retained in the same position relative to each other by the bending means 58. Therefore, rotation of the differential carrier 164 causes the idler gears 170 to rotate both bellows means 54 and 56 the same amount in the same direction with respect to the ends 61 and 62 and outer bellows means 63 to thereby rotate the predetermined plane of bending of the module 38.

The bending drive means 58 are similar to the rotation drive means 60 and include a plurality of motors 180 which are connected to drive the bellows means 54 and 56 in opposite directions through a gear train which is shown as a harmonic drive 182. The harmonic drive 182 includes the same basic elements as included in the other harmonic drive 142. Its output circular spline 184 operates to cause relative movement between a differential carrier 186 to which the motors 180 and idler gears 188 are connected and an extension 190 of the inner bellows means 54. The idler gears 188 sit between a ring gear 192 also connected to the inner bellows means 54 and a ring gear 194 connected to the outer bellows means 56. When the harmonic drive 182 produces motion between the differential carrier 186 and the extension 190, the idler gears 188 apply force to the ring gears 192 and 194 and cause the inner and outer bellows means 54 and 56 to be forced in opposite directions. As long as the rotation drive means 60 is not rotating the bending plane of the module 38, the idler gears 170 thereof assure that the inner and outer bellows means 54 and 56 must move in equal but opposite directions with respect to the outer bellows means 63. This causes the desired movement between the wedge links 40 to 50 to thereby cause the desired bending.

Figure 13:
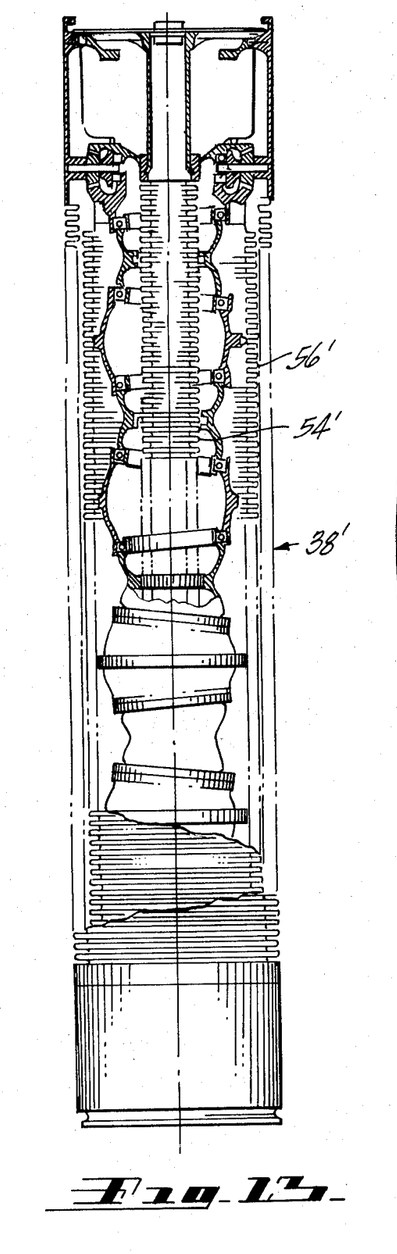
FIG. 13 is an elevational view partially in cross-section of an alternate module configuration to that shown in FIG. 3.
Figure 14:
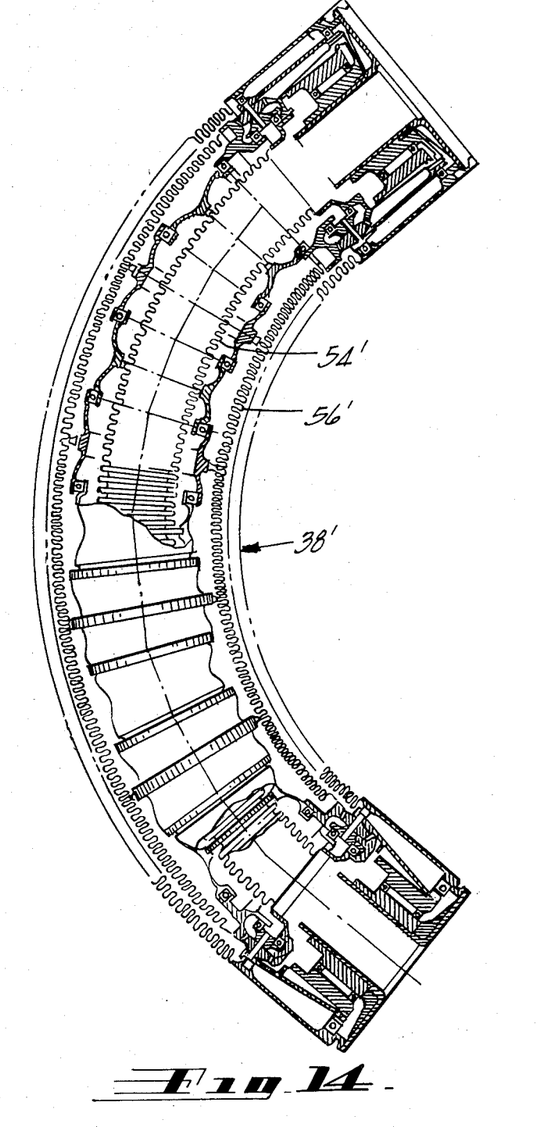
FIG. 14 is a cross-sectional view of the module of FIG. 13 in a bent condition.

The wedges 40 through 50 are connected by bearings 196 which are preferably low friction roller or ball bearings to allow easy relative motion between the wedges 40 through 50. In the embodiment shown, in FIGS. 3, 11, and 12, the wedges form parts of the bellows means while in FIG. 13 which is an alternate form, the wedges are merely connected to bellows means 54' and 56' which extend along the flexible portion of the module 38'. As can be seen in FIG. 14, the net result is the same and the desired bending and rotational movement in the manipulator 38' can still be accomplished.

Figure 15:
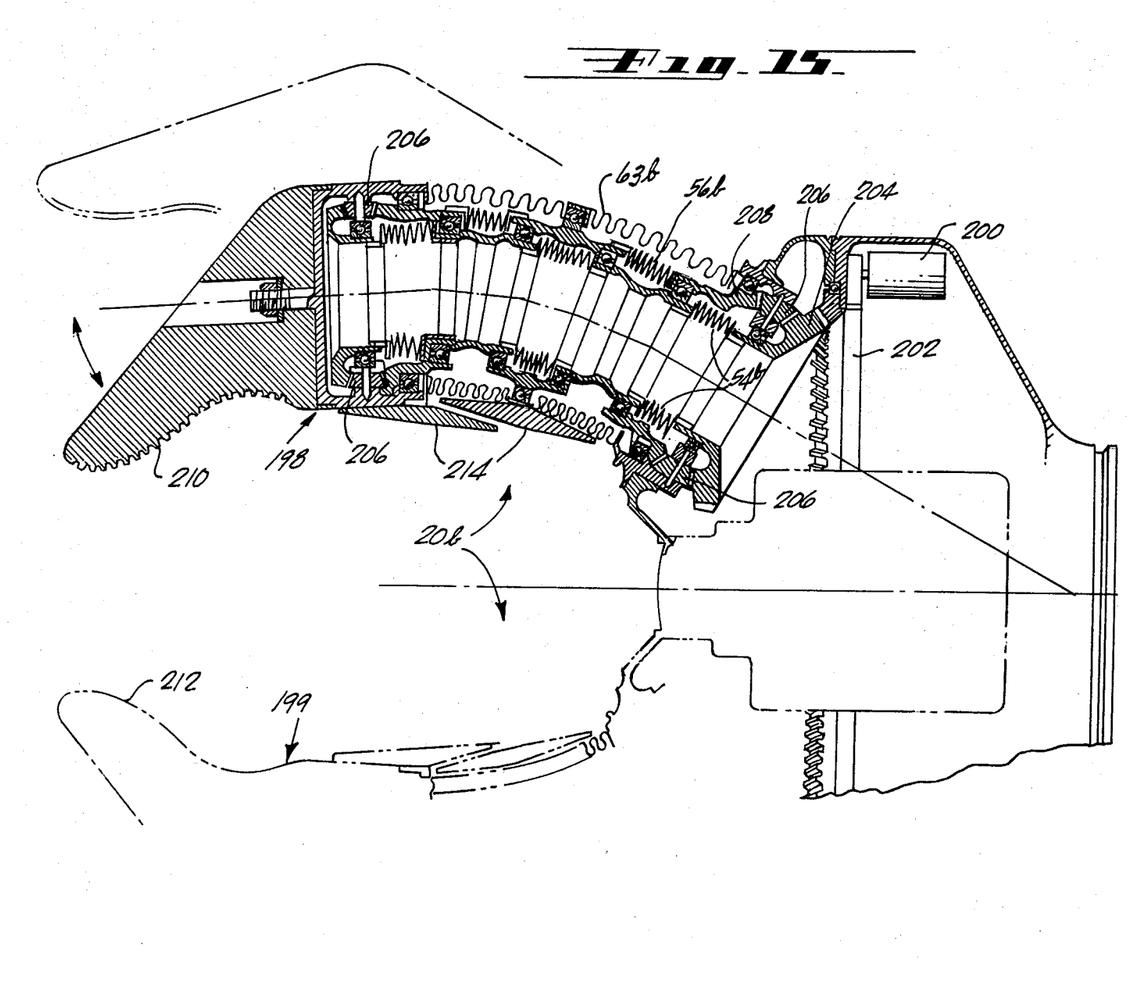
FIG. 15 is an enlarged partial cross-sectional view of the grappler finger manipulator system shown in FIG. 1.

FIG. 15 is an enlarged view of the grappler finger system 20b shown in FIG. 1 having two or more grappler fingers 198 and 199. Of course, each grappler finger 198 and 199 need only bend and therefore, no rotation means are provided. The grappler system 20b bends the fingers 198 and 199 in unison and includes motors 200 which rotate the bellows means 54b of each finger 198 and 199 through a drive ring 202 and a differential bevel gear 204 connected thereto. The drive ring 202 is the means of actuation as well as synchronism between the grappler fingers 198 and 199. The gear 204 is connected to the bellows means 56b by idler gears 206 and a facing ring gear 208. The idler gears 206 are mounted on the outer bellows means 63b and therefore the rotation of the bellows means 54b and its connected wedges causes an equal but opposite rotation of the other bellows means 56b and its wedges, thereby bending the fingers 198 and 199 as desired. Finger members 210 and 212 are provided on the outer ends of the fingers 198 and 199 respectively to provide grasping surfaces. Additional grasping surfaces can be provided by including plates 214 on the inner surfaces of the fingers 198 and 199 which also act to armor the outer bellows means 63b.

Thus there has been shown and described novel manipulator systems which fulfill all of the objects and advantages sought therefor. Many changes, alterations, modifications and other uses and applications of the subject manipulator systems will become apparent to those skilled in the art after considering this specification and the accompanying drawings. All such changes, modifications, variations and other uses and applications which do not depart from the spirit and scope of the invention are deemed to be covered by the invention which is limited only by the claims which follow.

What is claimed is:

1. An actuator system including at least one module, said module having:
   first and second end portions;
   a first plurality of wedge links;
   first means capable of transmitting torque connected to said first plurality of wedge links;
   a second plurality of wedge links, said first and second wedge links being in contact, rotatable with respect to each other and alternately positioned along said module;
   second means capable of transmitting torque connected to said second plurality of wedge links;
   third means capable of transmitting torque connected to said first end portion; and
   drive means connected to rotate said first torque transmitting means and said second torque transmitting means in opposite directions equal amounts with respect to said third torque transmitting means, thereby rotating said first and second pluralities of wedge links to cause bending of said module in a predetermined plane.

2. The actuator system defined in claim 1 wherein said first torque transmitting means are comprised of a plurality of bellows which extend between and connect said first plurality of wedge links.

3. The actuator system defined in claim 1 wherein said first, second and third torque transmitting means are comprised of bellows which extend from said first end portion to said second end portion of said module.

4. The actuator system defined in claim 1 including:
   control means for feeding bend position command signals to said module;
   means in said module for generating signals responsive to the bend position of said module; and
   means responsive to difference between said bend position command signals and said bend position signals to produce error signals which are fed to said drive means to cause said drive means to bend said module to the bend position commanded.

5. The actuator system defined in claim 4 wherein said control means are replica control means, said replica control means including:
   reduced size replica modules in duplication to the modules of said system; and
   means in said replica modules for producing control signals for said modules in response to bending of said replica means.

6. The actuator system defined in claim 1 whereby each module includes:
   electrical connectors on said first and second ends thereof adapted to mate with said connectors on other modules; and
   electrical conductors connecting said electrical connectors together so that said electrical conductors appear at different locations at the opposite ends of said module, said different locations being chosen to make predetermined pairs of conductors appear at locations on module ends predetermined by the position of said module end in said system.

7. The actuator system defined in claim 6 including at least one extender module, said extender module including:
   first and second end portions adapted to mate with end portions of other modules;
   a rigid frame extending between said first and second end portions and rigidly connected thereto;
   electrical connectors on said first and second end portions thereof adapted to mate with connectors on other modules; and
   conductors extending between said electrical connectors, each of said conductors appearing on both end portions of said extender module with the identical orientation.

8. The actuator system defined in claim 1 wherein said module includes:
   second drive means connected to rotate said first and second torque transmitting means equally in the same direction with respect to said third torque transmitting means, thereby rotating said predetermined plane of module bending.

9. The actuator system defined in claim 8 including:
   replica control means for feeding bend position command signals and plane rotation command signals to said module, said replica control means having reduced size replica modules in duplication to the modules of said system, said replica modules including means for producing control signals for said modules in response to bending movement in any plane, said drive means and said second drive means being responsive to said control signals to cause said modules to assume a relative spatial relationship like the relative spatial relationship of the replica modules.

10. The actuator system defined in claim 1 wherein said module includes at least two bendable portions each having:
    first and second end portions;
    a first plurality of wedge links;
    first means capable of transmitting torque connected to said first plurality of wedge links;
    a second plurality of wedge links, said first and second wedge links being contact, rotatable with respect to each other and alternately positioned along said module;
    second means capable to transmitting torque connected to said second plurality of wedge links; and
    third means capable of transmitting torque connected to said first end portion, whereby said drive means are connected to rotate said first and second torque transmitting means of each of said bendable portions in opposite directions equal amounts with respect to said third torque transmitting means thereby causing bending of said bendable portions in unison, said predetermined bending planes of said first and second bendable portions being oriented so said bendable portions bend toward the same space.

11. The actuator system defined in claim 10 wherein said bendable portions include grasping members on the second end portions thereof.

12. The actuator system defined in claim 1 wherein said wedge links are hollow wedge links, and wherein said end portions define openings therethrough, said module thereby defining a longitudinal tunnel from end portion to end portion thereof.

13. The actuator system defined in claim 12 including means to connect and hermetically seal the end portions of modules to each other so that a sealed conduit is defined through the system by said longitudinal tunnels.

* * * * *